United States Patent
Ueno et al.

(10) Patent No.: US 8,363,982 B2
(45) Date of Patent: Jan. 29, 2013

(54) METHOD FOR ROTATING IMAGE, PROGRAM FOR ROTATION, RECORDING MEDIUM, AND ROTATION DEVICE

(75) Inventors: Toshiyuki Ueno, Tokyo (JP); Satoshi Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 409 days.

(21) Appl. No.: 12/681,404

(22) PCT Filed: Oct. 9, 2008

(86) PCT No.: PCT/JP2008/068372
§ 371 (c)(1),
(2), (4) Date: Apr. 2, 2010

(87) PCT Pub. No.: WO2009/048103
PCT Pub. Date: Apr. 16, 2009

(65) Prior Publication Data
US 2010/0209017 A1    Aug. 19, 2010

(30) Foreign Application Priority Data
Oct. 9, 2007    (JP) ................................. 2007-263697

(51) Int. Cl.
*G06K 9/32*    (2006.01)
(52) U.S. Cl. ........ 382/296; 382/297; 382/305; 345/649; 345/659
(58) Field of Classification Search .................. 382/295, 382/296, 297, 305; 345/649, 659
See application file for complete search history.

(56) References Cited

U.S. PATENT DOCUMENTS

| 5,101,448 | A  | * | 3/1992  | Kawachiya et al. | .......... | 382/287 |
| 5,181,260 | A  | * | 1/1993  | Kurosu et al.    | ................. | 382/289 |
| 5,970,183 | A  | * | 10/1999 | Amemiya et al.   | ............ | 382/282 |
| 7,130,351 | B1 | * | 10/2006 | Lynch et al.     | ............. | 375/240.16 |
| 8,045,229 | B2 | * | 10/2011 | Ohashi           | ........................... | 358/2.1 |

FOREIGN PATENT DOCUMENTS

| JP | 60-103390 A   | 6/1985 |
| JP | 64-59570 A    | 3/1989 |
| JP | 8-231236 A    | 8/1994 |
| JP | 10-208032 A   | 8/1998 |
| JP | 2003115993 A  | 4/2003 |
| JP | 2003178300 A  | 6/2003 |

OTHER PUBLICATIONS

International Search Report for PCT/JP2008/068372 mailed Nov. 18, 2008.

* cited by examiner

*Primary Examiner* — Yosef Kassa

(57) ABSTRACT

A method for rotating an image with which the image can be rotated with a small memory area, a program for rotation, a recording medium and a rotation device are provided.

A memory area for storing image data is sectioned into a plurality of square image areas, one line among lines of a periphery of the memory area in an initial state is secured as a temporary storage area, the remaining area is secured as an image area, and an image in an initial state is rotated by performing rotation and movement of the image data in the memory area for each square unit via the temporary storage area.

17 Claims, 8 Drawing Sheets

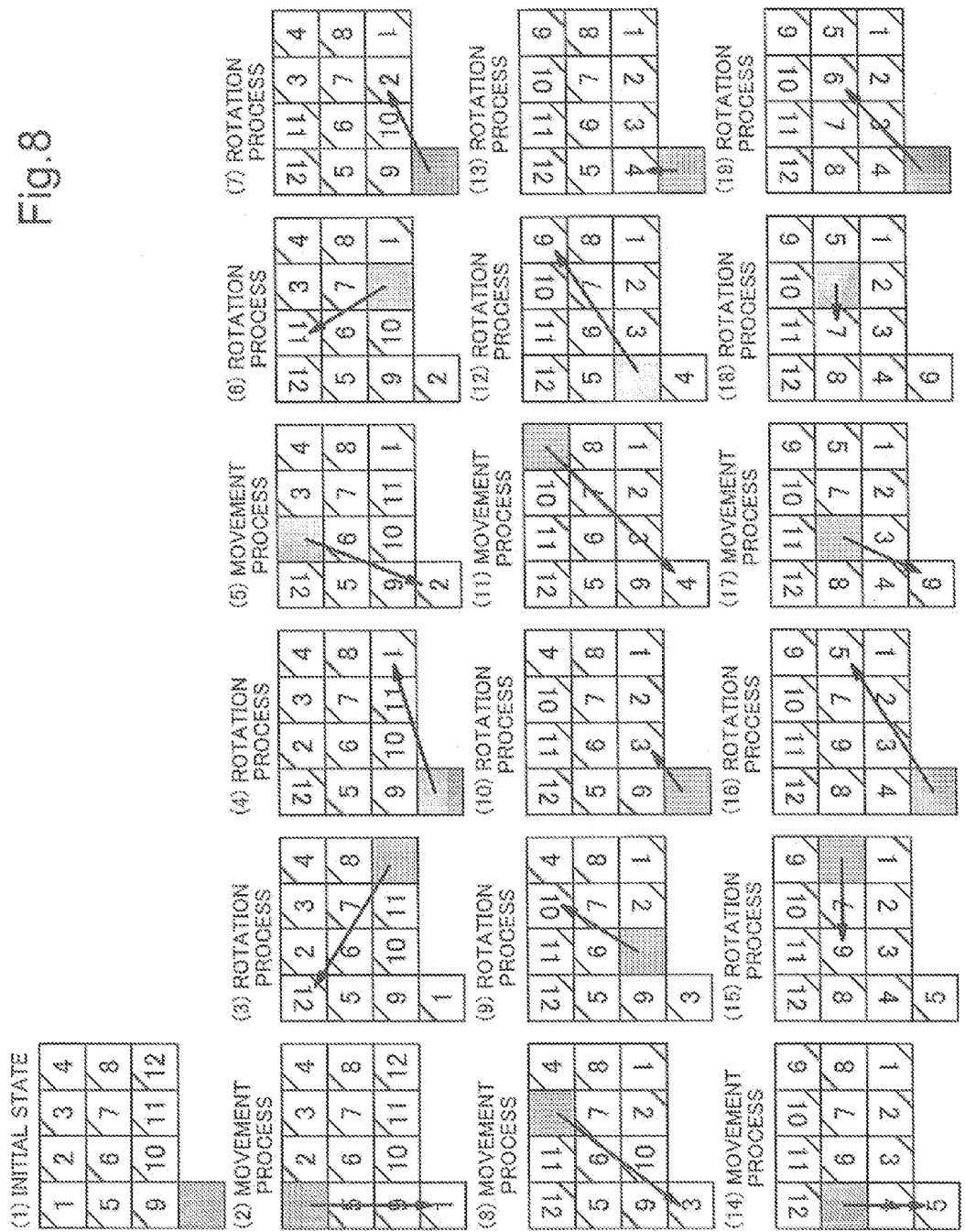

METHOD FOR ROTATING IMAGE, PROGRAM FOR ROTATION, RECORDING MEDIUM, AND ROTATION DEVICE

TECHNICAL FIELD

The present invention relates to a method for rotating an image, a program for rotation, a recording medium and a rotation device.

BACKGROUND ART

When rotating a still image or a moving image in an image rotation process, a memory for storing an image before rotation and a memory for storing an image after rotation are needed. This is because if a memory has a capacity for one image screen, when a pixel of the image before rotation is read out, rotated, and written in a predetermined position, information stored in the predetermined position is lost because of overwriting in which the pixel before reading is overwritten with the image after rotation by a write operation. For this reason, the memory has to have the capacity for two image screens to rotate an image of one screen.

For this reason, a method for rotation with a reduced memory capacity is disclosed in patent document 1.

An image rotation processing device of patent document 1 is composed of storage means for storing image data, rotation process means for generating one or more square blocks and performing a rotation process, format conversion means for performing conversion into either a data format that is rotatable or a data format that is not rotatable, read address generating means for generating a read address to the storage means, and write address generating means for generating the address in a predetermined order in a write access to the storage means, and operates as follows.

In the image rotation processing device, the blocks are read in the predetermined order, converted into the format that is rotatable by the format conversion means, and written into a temporary area of the storage means and the written image is read out in a read address generation order that is selected from an address generation pattern according to a rotation angle, converted into the format that is not rotatable by the format conversion means, and written into a block area after rotation to the storage means in the predetermined order.

[Patent document 1] Japanese Patent Application Laid-Open No. 2003-115993

DISCLOSURE OF INVENTION

Technical Problem

However, the invention described in patent document 1 requires four dummy areas, and further requires a temporary save area and a rotation work area. Therefore, further reduction of the memory area is required.

Therefore, the object of the present invention is to provide a method for rotating an image with which the image can be rotated with a small memory area, a program for rotation, a recording medium and a rotation device.

Technical Solution

A first method of the present invention is a method for rotating an image characterized by comprising the steps of: sectioning a memory area for storing image data into a plurality of squares, securing one line among lines of a periphery of the memory area in an initial state as a temporary storage area and securing the remaining area as an image area, and rotating an image in an initial state by rotating and moving the image data in the memory area for each square unit via the temporary storage area.

A first program of the present invention is a program for rotating an image characterized by making a computer execute the processes of: sectioning a memory area of a memory unit for storing image data into a plurality of squares, securing one line among lines of a periphery of the memory area in an initial state of the memory unit as a temporary storage area and securing the remaining area as an image area, and rotating an image in an initial state by rotating the image data in the memory area of the memory unit for each square unit via the temporary storage area by a rotation process unit and moving the image data by a movement process unit.

A first recording medium of the present invention is characterized in that the first program is recorded therein.

A first device of the present invention is an image rotation device including a memory unit for storing image data, a movement process unit for moving of the image data, a rotation process unit for rotating the image data, and a control unit for controlling the memory unit, the movement process unit and the rotation process unit is characterized in that the control unit sections a memory area of the memory unit into a plurality of squares, secures one line among lines of a periphery of the memory area in an initial state as a temporary storage area, secures the remaining area as an image area, and rotates an image in an initial state by rotating and moving of the image data in the memory area for each square unit via the temporary storage area.

ADVANTAGEOUS EFFECTS

By employing the present invention, a provision of a method for rotating an image with which an image can be rotated with a small memory area by sectioning a memory area for storing image data into a plurality of squares, securing one line among lines of a periphery of a memory area in an initial state as a temporary storage area and securing the remaining area as an image area, and rotating and moving the image data in the memory area for each square unit via the temporary storage area, a program for rotation, a recording medium, and a rotation device can be realized.

BEST MODE FOR CARRYING OUT THE INVENTION

Feature of the Invention

The present invention has a feature in which in a device for processing a still image or a moving image, a memory capacity used for a rotation process of an entire image is reduced by sectioning image data into a plurality of squares and rotating or moving each square.

Namely, the present invention finally obtains an image by sectioning the image data into a plurality of squares and rotating or moving each square that is the same as the image obtained by rotating an entire image. A square 1 is moved to a free area of a memory and a square 2 that is finally placed in an area in which the square 1 had been placed is rotated and placed in it. After the square 2 has been placed at a predetermined location, a square 3 whose destination position is an area in which the square 2 had been placed is rotated and the rotated square 3 is placed in the area in which the square 2 had been placed. This operation is repeated a plurality of times and finally, the rotated entire image is obtained.

[Exemplary Embodiment 1]
[Configuration of the Rotation Device]

Next, a configuration of an exemplary embodiment of the present invention will be described in detail with reference to the drawings.

FIG. 1 is a block diagram showing an exemplary embodiment of an image rotation device according to the present invention.

The image rotation device is composed of a memory unit 100 for mainly storing image data and a rotation unit 101 for performing a rotation process.

For example, a HDD (Hard Disk Drive) is used for the memory unit 100, but a flash memory may be used for it.

The rotation unit 101 includes a control unit 102 for performing control to move or rotate an image for each square, a movement process unit 103 for performing a movement process, and a rotation process unit 104 for performing the rotation process.

[Description of the Operation]

Next, an operation of the exemplary embodiment of the present invention will be described with reference to FIG. 2.

FIG. 2 is one example of a flow chart illustrating operation of the rotation device shown in FIG. 1.

An image memory is sectioned into a plurality of squares (step S1).

A memory is secured. This is because the memory area (temporary storage area) has to be secured just behind memory area (image area) in which the image is stored (step S2).

It is determined whether all squares have been already rotated. This determination is performed to determine whether all square image areas have been rotated and the entire image has been correctly rotated (step S3).

When it is determined that all squares have not been already rotated (step S3/N), it is determined whether the rotation can be performed.

This determination is performed to determine whether a free area exists or not among the areas (image area or temporary storage area) in which one area should be stored after the entire image has been rotated (step S4).

When it is determined that the rotation can be performed (step S4/Y), the rotation is performed (step S5), and the process is returned to step S3. The image data which should be stored in the free area (image area or temporary storage area) after the entire image has been rotated is rotated and stored in the free area (image area or temporary storage area). The image data before rotation had been stored is deleted from the area to make it free.

When it is determined that the rotation can not be performed (step S4/N), the square is moved (step S6), and the process is returned to step S3. Proper image data that is not rotated and stored in the image area in which the image is stored after the entire image has been rotated is moved to a proper free area (image area or temporary storage area) in which the image data is not stored before the entire image is rotated and after the entire image has been rotated. After the movement, the area (image area or temporary storage area) in which the image data had been stored is deleted to make it free.

After this, these steps are repeated. When it is determined that all the squares have been already rotated (step S3/Y), the process ends.

By these processes, the image rotation process can be implemented with a small memory area.

[Exemplary Embodiment 2]

The other exemplary embodiment of the present invention will be described with reference to FIG. 3.

FIG. 3 is an explanatory drawing showing an exemplary embodiment of a method for rotating an image according to the present invention.

In the method for rotating an image, one outer line among the image areas is rotated and moved in one direction, another outer line at a right-angle is rotated and moved in the same direction, the temporary storage area is secured by rotating and moving a square at a center of the image area after rotation and movement to the outside of the image area, the temporary storage area is exchanged with another square, and lastly, the outer image area is exchanged with the temporary storage area. Accordingly, the image in an initial state is rotated.

In the rotation method, in the initial state, image areas which are arranged in m lines in vertical and n lines in horizontal, the total number of image areas is m·n, and each of the image areas is defined as: from the left of the uppermost row, an image area a11, an image area a12, an image area a13, an image area a14, . . . , and an image area a1n; from the left of the next row below the uppermost row, an image area a21, an image area a22, an image area a23, an image area a24, . . . , and an image area a2n; and after this, in the same way, from the left of the lowermost row, an image area am1, an image area am2, an image area am3, an image area am4, . . . , and an image area amn, and a temporary storage area b1, a temporary storage area b2, a temporary area b3, a temporary area b4, . . . , and a temporary area bn that are arranged in one row and n columns below the lowermost row are secured.

Next, the image data in the image area a1n, the image area a2n, the image area a3n, . . . , and the image area amn are rotated and the rotated image data are moved to the temporary storage area b2, the temporary storage area b3, the temporary storage area b4, . . . , and the temporary storage area bn, respectively; the image data in the image area a11, the image area a12, the image area a13, . . . , and the image area a1 n-1 are rotated and the rotated image data are moved to the positions of the image area a1 n, the image area a2n, the image area a3n, . . . , and the image area am-1 n, respectively; the image data in the image area a21, the image area a31, the image area a41, . . . , and the image area am 1 are rotated and the rotated image data are moved to the positions of the image area a12, the image area a13, the image area a14, . . . , and image area a1 n-1, respectively; and the image data in the image area a32 is rotated and the rotated image data is moved to the position of the image area a11.

The image data in each of the image areas is rotated and moved to a free area in a small matrix formed with the image area a12, the image area a13, the image area a14, . . . , the image area a1n, the image area a22, the image area a23, the image area a24, . . . , the image area a2n, the image area a32, the image area a33, the image area a34, . . . , the image area a3n, . . . , the image area am2, the image area am3, the image area am4, . . . , and the image area amn via the temporary storage areas in order, and whereby the image data in the initial state is rotated.

By these processes, the image rotation process can be implemented with a small memory area.

[Exemplary Embodiment 3]

Another exemplary embodiment of the method for rotating an image according to the present invention will be described with reference to FIG. 1, FIG. 4 and FIG. 5.

FIG. 4 is a conceptual diagram showing a memory area in which the number of an image areas is twelve (three lines in vertical and four lines in horizontal) and the number of the temporary storage areas is four.

FIG. 5(1) to FIG. 5(8) are explanatory drawings showing the operating state of the memory area shown in FIG. 4.

In FIG. 5, "1" shown in FIG. 5(1) represents the image data in the image area a11 in FIG. 4 and "2" shown in FIG. 5(1) represents the image data in the image area a12 in FIG. 4. "3" shown in FIG. 5(1) represents the image data in the image area a13 in FIG. 4 and "4" shown in FIG. 5(1) represents the image data in the image area a14 in FIG. 4. "5" shown in FIG. 5(1) represents the image data in the image area a21 in FIG. 4 and "6" shown in FIG. 5(1) represents the image data in the image area a22 in FIG. 4. "7" shown in FIG. 5(1) represents the image data in the image area a22 in FIG. 4 and "8" shown in FIG. 5(1) represents the image data in the image area a24 in FIG. 4.

"9" shown in FIG. 5(1) represents the image data in the image area a31 in FIG. 4 and "10" shown in FIG. 5(1) represents the image data in the image area a32 in FIG. 4. "11" shown in FIG. 5(1) represents the image data in the image area a33 in FIG. 4 and "12" shown in FIG. 5(1) represents the image data in the image area a34 in FIG. 4.

The shaded lowermost portion shown in FIG. 5(1) indicates the temporary areas b1 to b4 shown in FIG. 4.

First, the movement process unit 103 will be described.

The movement process unit 103 moves the specified square area to a specified area on the memory unit and stores it based on a designation from the control unit 102.

Next, the rotation process unit 104 will be described.

The rotation process unit 104 rotates the specified square area by a specified angle and stores it in the specified areas (image areas a11 to a34 or temporary storage areas b1 to b4) on the memory unit 100 based on the designation from the control unit 102.

Next, the control unit 102 will be described.

The control unit 101 performs a control with which the image is sectioned into the squares, each of which is sequentially moved or rotated, and finally, an image that is the same as the image obtained by rotating the entire image is obtained. An image having an aspect ratio of 4:3 is used for this explanation, and this image is sectioned into twelve squares that are the image areas a11 to a34 (refer to FIG. 4). This image is stored in the memory unit 100. In this example, a clockwise rotation is positive and the image is rotated by 90 degrees. For the explanation, the triangle is indicated on the upper left of each area in an upright state shown in FIG. 4. Further, when the aspect ratio is x:y, x·y squares have to be produced by sectioning.

In this case, because the image is horizontally long, it is necessary to secure the memory area in the memory unit 100 in which the image after 90 degrees rotation can be stored. The memory is additionally secured just behind memory area in which the image before rotation is stored. The temporary storage areas b1 to b4 that are the memory areas are additionally secured so that the total secured memory area becomes a square size whose side length is equal to a long side (in this case, horizontal) length of the image.

Here, the processes shown in FIG. 4 are described in detail. The initial state before rotation is shown in FIG. 5(1) and the state after the entire image has been rotated is shown in FIG. 5(8). Further, an instruction on a rotation process and a movement process is given by the control unit 102, and the rotation process unit 104 and the movement process unit 103 actually perform the rotation process and the movement process, respectively.

FIG. 5(1): Initial state

FIG. 5(2): rotation process three times

A ninety degrees rotation process is performed on the image data in the image area a14, the image area a24 and the image area a34 and the rotated image data are stored in the temporary storage areas b2 to b4, respectively in which after the entire image has been rotated, the image data in the image area a14, the image data in the image area a24 and the image data in the image area a34 should be stored among the temporary storage areas b1 to b4 that are the memory areas additionally secured.

FIG. 5(3): rotation process three times

The ninety degrees rotation process is performed on the image data in the image area a11, the image area a12 and the image area a13, and the rotated image data are stored in the image area a14, the image area a24 and the image area a34, respectively.

FIG. 5(4): rotation process three times

The ninety degrees rotation process is performed on the image data in the image area a23, the image area a21 and the image area a31, and the rotated image data are stored in the image area a11, the image area a13 and the image area a12 in the initial state, respectively.

FIG. 5(5): rotation process one time

The ninety degrees rotation process is performed on the image data in the image area a22 area and the rotated image data is stored in the image area a23 in the initial state.

FIG. 5(6): rotation process one time

The ninety degrees rotation process is performed on the image data in the image area a32 area and the rotated image data is stored in the image area a22 in the initial state.

FIG. 5(7): rotation process one time

The ninety degrees rotation process is performed on the image data in the image area a33 and the rotated image data is stored in the image area a32 in the initial state.

FIG. 5(8): movement process one time

The image data in the image area a11 obtained by the ninety degrees rotation process shown in FIG. 5(4) is stored in the image area a33 in the initial state by the movement process.

Further, in the processes of this exemplary embodiment, because the temporary storage area b1 located below the image area a31 is not used in FIG. 5(1) to FIG. 5(8), the processes of this exemplary embodiment can be carried out without securing the temporary storage area b1.

Here, the invention described in patent document 1 needs six temporary storage areas in total that are a dummy area arranged in one line in horizontal, a temporary save area, and a rotation work area in addition to twelve image areas arranged in three lines in vertical and four lines in horizontal as an image memory. Meanwhile, this exemplary embodiment needs only four (substantially, three) temporary storage areas for the same image memory. Therefore, in the exemplary embodiment, the memory area used for rotating an image can be reduced.

[Exemplary Embodiment 4]

In case of 180 degrees rotation, it is possible to rotate the entire image by additionally securing a memory area for the image data of one sectioned square area. An example of the steps of the movement process and the rotation process in this case is shown in FIG. 6.

FIG. 6 is an explanatory drawing showing another exemplary embodiment of the method for rotating an image according to the present invention.

The method for rotating an image is characterized in that a memory area for storing the image data is sectioned into a plurality of squares and those are secured as image areas, a temporary storage area whose size is the same as that of the square is secured outside the image area, and the image data in the initial state is rotated by performing rotation and movement of the image data in the memory area and the temporary storage area for each square unit via the temporary storage area.

In the method for rotating an image, one image area among the image areas is moved to the temporary storage area, an area of a movement destination of one image area among the image areas is moved to a free area in the one image area, and an image in an initial state is rotated by repeating rotation and movement of the one image area to the free area of the movement destination.

In the method for rotating an image, in the initial state, image areas which are arranged in m lines in vertical and n lines in horizontal, the total number of image areas is m·n, and each of the image areas is defined as: from the left of the uppermost row, an image area a11, an image area a12, an image area a13, an image area a14, . . . , and an image area a1n; from the left of the next row below the uppermost row, an image area a21, an image area a22, an image area a23, an image area a24, . . . , and an image area a2n; and after this, in the same way, from the left of the lowermost row, an image area am1, an image area am2, an image area am3, an image area am4, . . . , and an image area amn, and one temporary storage area b below the lowermost row are secured.

Next, the image data in an area aij ($1 \leq i \leq m$ and $1 \leq j \leq n$) is temporarily stored in the temporary storage area b for i from 1 to m and for j from 1 to n in order, the image data in an image area axy ($x \neq i$, $1 \leq x \leq m$, $y \neq j$, and $1 \leq y \leq n$) is rotated and the rotated image data is moved to a position of the area aij, and the image data in the temporary storage area b is moved to the position of the image area axy. The image data in the initial state is rotated by repeating these processes.

By these processes, the image rotation process can be implemented with a small memory area.

[Exemplary Embodiment 5]

FIG. 7 is a conceptual diagram showing a memory area in which the number of an image areas is twelve (three lines in vertical and four lines in horizontal) and the number of the temporary storage areas is four.

FIG. 8(1) to FIG. 8(19) are explanatory drawings showing the operating state of the memory area shown in FIG. 7.

In FIG. 8, "1" shown in FIG. 8(1) represents the image data in the image area a11 in FIG. 7 and "2" shown in FIG. 8(1) represents the image data in the image area a12 in FIG. 7. "3" shown in FIG. 8(1) represents the image data in the image area a13 in FIG. 7 and "4" shown in FIG. 8(1) represents the image data in the image area a14 in FIG. 7. "5" shown in FIG. 8(1) represents the image data in the image area a21 in FIG. 7 and "6" shown in FIG. 8(1) represents the image data in the image area a22 in FIG. 7. "7" shown in FIG. 8(1) represents the image data in the image area a22 in FIG. 7 and "8" shown in FIG. 8(1) represents the image data in the image area a24 in FIG. 7. "9" shown in FIG. 8(1) represents the image data in the image area a31 in FIG. 7 and "10" shown in FIG. 8(1) represents the image data in the image area a32 in FIG. 7. "11" shown in FIG. 8(1) represents the image data in the image area a33 in FIG. 7 and "12" shown in FIG. 8(1) represents the image data in the image area a34 in FIG. 7.

The shaded lowermost portion shown in FIG. 8(1) indicates the temporary area b shown in FIG. 7.

A rotation process operation will be described below.

FIG. 8(1): Initial state

FIG. 8(2): Movement process

The image data in the image area a11 is moved to the temporary storage area b.

FIG. 8(3): Rotation process

The image data in the image area a34 is rotated and the rotated image data is moved to a position of the image area a11.

FIG. 8(4): Rotation process

The image data in the temporary storage area b is moved to a position of the image area a34.

FIG. 8(5): Movement process

The image data in the image area a12 is moved to the temporary storage area b.

FIG. 8(6): Rotation process

The image data in the image area a33 is rotated and the rotated image data is moved to a position of the image area a12.

FIG. 8(7): Rotation process

The image data in the temporary storage area b is moved to a position of the image area a33.

FIG. 8(8): Movement process

The image data in the image area a13 is moved to the temporary storage area b.

FIG. 8(9): Rotation process

The image data in the image area a32 is rotated and the rotated image data is moved to a position of the image area a13.

FIG. 8(10): Rotation process

The image data in the temporary storage area b is rotated and the rotated image data is moved to a position of the image area a32.

FIG. 8(11): Movement process

The image data in the image area a14 is moved to the temporary storage area b.

FIG. 8(12): Rotation process

The image data in the image area a31 is rotated and the rotated image data is moved to a position of the image area a14.

FIG. 8(13): Rotation process

The image data in the temporary storage area b is moved to a position of the image area a31.

FIG. 8(14): Movement process

The image data in the image area a21 is moved to the temporary storage area b.

FIG. 8(15): Rotation process

The image data in the image area a24 is rotated and the rotated image data is moved to a position of the image area a21.

FIG. 8(16): Rotation process

The image data in the temporary storage area b is rotated and the rotated image data is moved to a position of the image area a24.

FIG. 8(17): Movement process

The image data in the image area a22 is moved to the temporary storage area b.

FIG. 8(18): Rotation process

The image data in the image area a23 is rotated and the rotated image data is moved to a position of the image area a22.

FIG. 8(19): Rotation process

The image data in the initial state can be rotated by moving the image data in the temporary storage area b to a position of the image area a23.

By these processes, the image rotation process can be implemented with a small memory area.

Here, the invention described in patent document 1 needs six temporary storage areas in total that are a dummy area arranged in one line in horizontal, a temporary save area, and a rotation work area in addition to twelve image areas arranged in three lines in vertical and four lines in horizontal as an image memory. Meanwhile, this exemplary embodiment needs only one temporary storage area for the same image memory. Therefore, in the exemplary embodiment, the memory area used for rotating an image can be reduced.

[Exemplary Embodiment 6]
<Program and Recording Medium>

The image rotation device of the present invention described above is realized by a program for rotation which makes a computer execute a rotation process.

The program for rotation makes the computer execute the following processes:

(a) a process to section a memory area of the memory unit for storing the image data into a plurality of squares;

(b) a process to secure one line among lines of a periphery of the memory area in an initial state of the memory unit as the temporary storage area and secure the remaining area as an image area; and (c) a process to rotate an image in an initial state by performing rotation of the image data in the memory area of the memory unit for each square unit via the temporary storage area by the rotation process unit and moving the image data by a movement process unit.

Further, the program for rotation may make the computer execute the following processes:

(1) a process to rotate and move one outer line among the image data in the image area of the memory unit in one direction;

(2) a process to rotate and move another outer line at a right-angle in the same direction;

(3) a process to rotate and move a square at a center of the image area after rotation and movement to the outside of the image area to secure the temporary storage area and to exchange the temporary storage area with another square; and (4) a process to rotate the image in the initial state by exchanging a square outside the image area with the temporary storage area lastly.

By these processes, the image rotation process can be implemented with a small memory area.

[Exemplary Embodiment 7]

The program for rotation makes the computer execute the following processes:

(a) a process to rotate and move one outer line among the image data in the image area of the memory unit in one direction;

(b) a process to rotate and move another outer line at a right-angle in the same direction;

(c) a process to rotate and move a square at a center of the image area after rotation and movement to the outside of the image area to secure the temporary storage area and to exchange the temporary storage area with another square; and (d) a process to rotate the image in the initial state by exchanging a square outside the image area with the temporary storage area lastly.

Further, the program for rotation may make the computer execute the following processes:

(1) a process to make the movement process unit move one square among the image areas to the temporary storage area of the memory unit;

(2) a process to make the movement process unit move a square of a movement destination of one square among the image areas of the memory unit to a free area of the one square; and (3) a process to rotate the image in the initial state by repeating rotation and movement of the one square to the free area of the movement destination by the rotation process unit.

By these processes, the image rotation process can be implemented with a small memory area.

For example, a widely-used device such as a personal computer, a workstation, or the like can be used for the computer. However, the present invention is not limited to these.

As a result, when a computer environment in which the program for rotation can be executed is provided, the rotation device of the present invention can be realized everywhere.

Such program for rotation may be stored in a computer-readable recording medium.

For example, a computer-readable recording medium such as a CD-ROM (Compact Disc Read Only Memory), a flexible disc (FD), a CD-R (CD Recordable), a DVD (Digital Versatile Disk) or the like, a HDD (Hard Disc Drive), and a semiconductor memory such as a flash memory, a RAM (Random Access Memory), a ROM (Read Only Memory), a FeRAM (ferroelectric memory), or the like can be used for the recording medium.

Further, the above mentioned exemplary embodiment shows an example of the preferred embodiment of the present invention, the present invention is not limited to these, and variations of the present invention are possible without departing from the scope of the invention.

This application is the National Phase of PCT/JP2008/068372, filed Oct. 9, 2007, which is based upon and claims the priority based on Japanese Patent Application No. 2007-263697 filed on Oct. 9, 2007, the disclosure of which is hereby incorporated by reference in its entirety.

BRIEF DESCRIPTION OF DRAWINGS

FIG. 8(1) to FIG. 8(19) are explanatory drawings showing the operating state of the memory area shown in FIG. 7.

Figure 1:
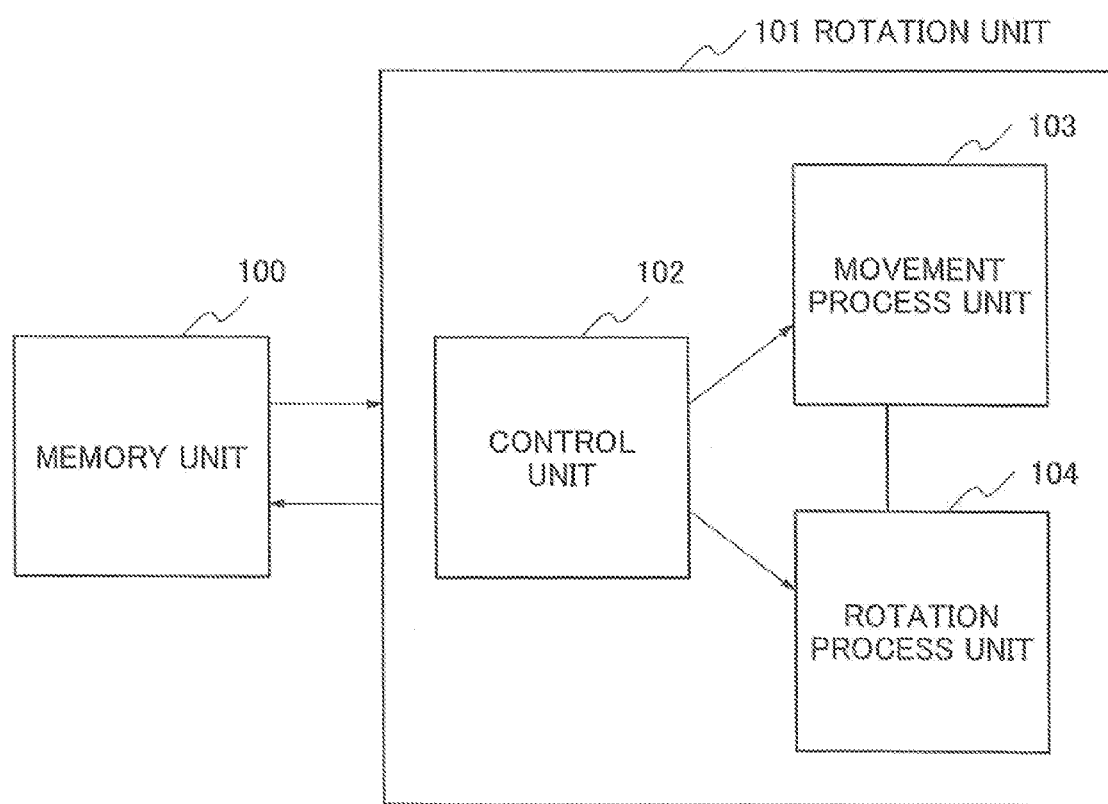
FIG. 1 is a block diagram showing an exemplary embodiment of an image rotation device according to the present invention.
Figure 2:
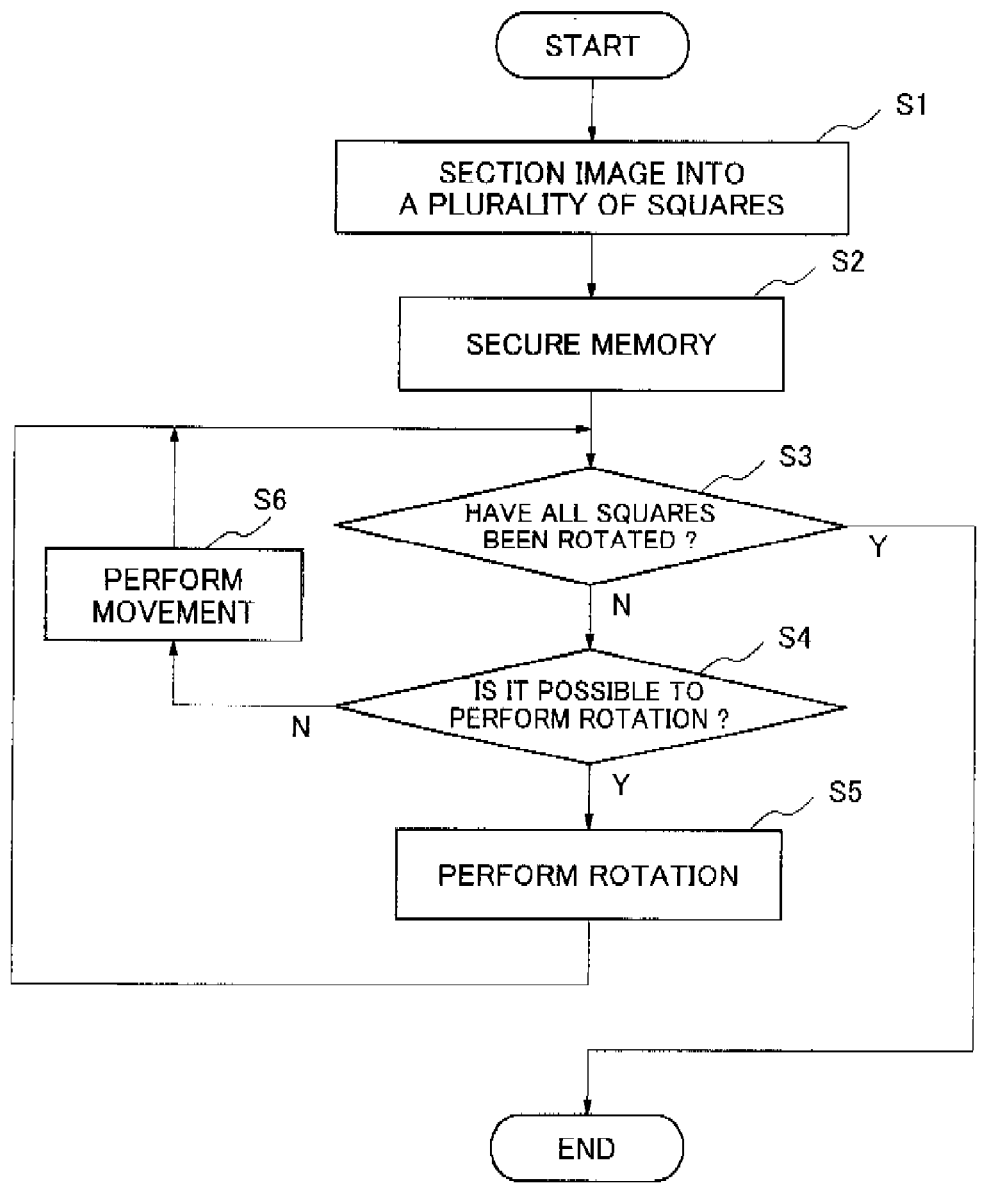
FIG. 2 is one example of a flow chart illustrating operation of the rotation device shown in FIG. 1.
Figure 3:
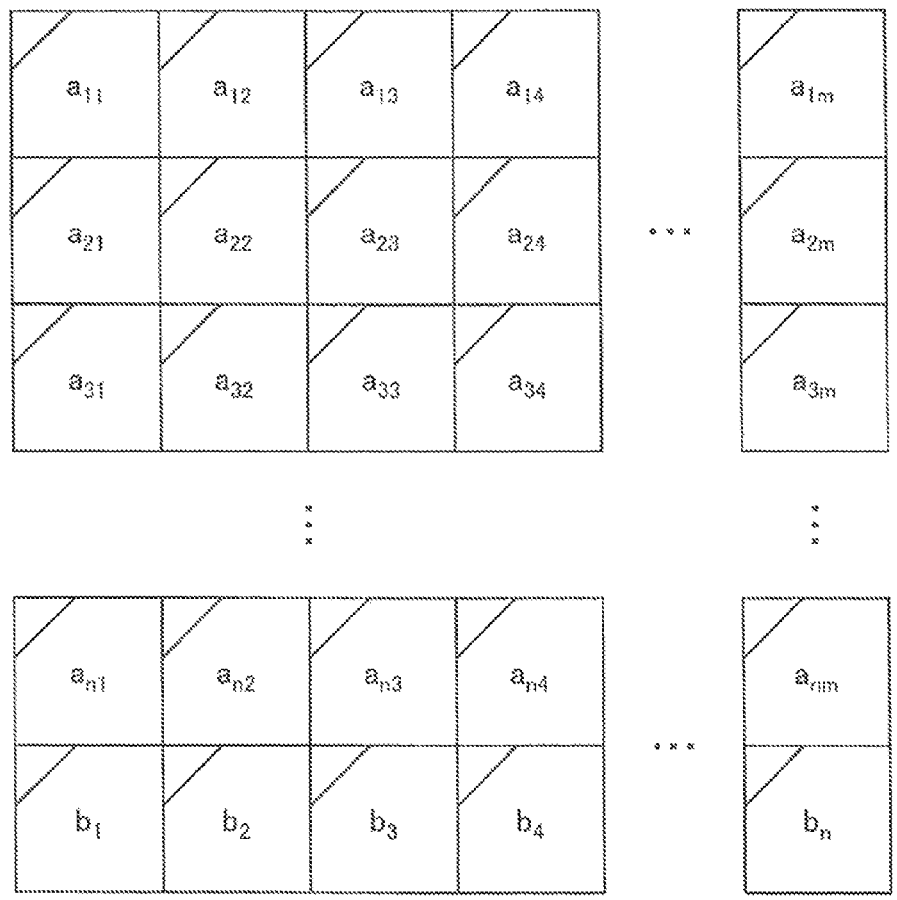
FIG. 3 is an explanatory drawing showing an exemplary embodiment of a method for rotating an image according to the present invention.
Figure 4:
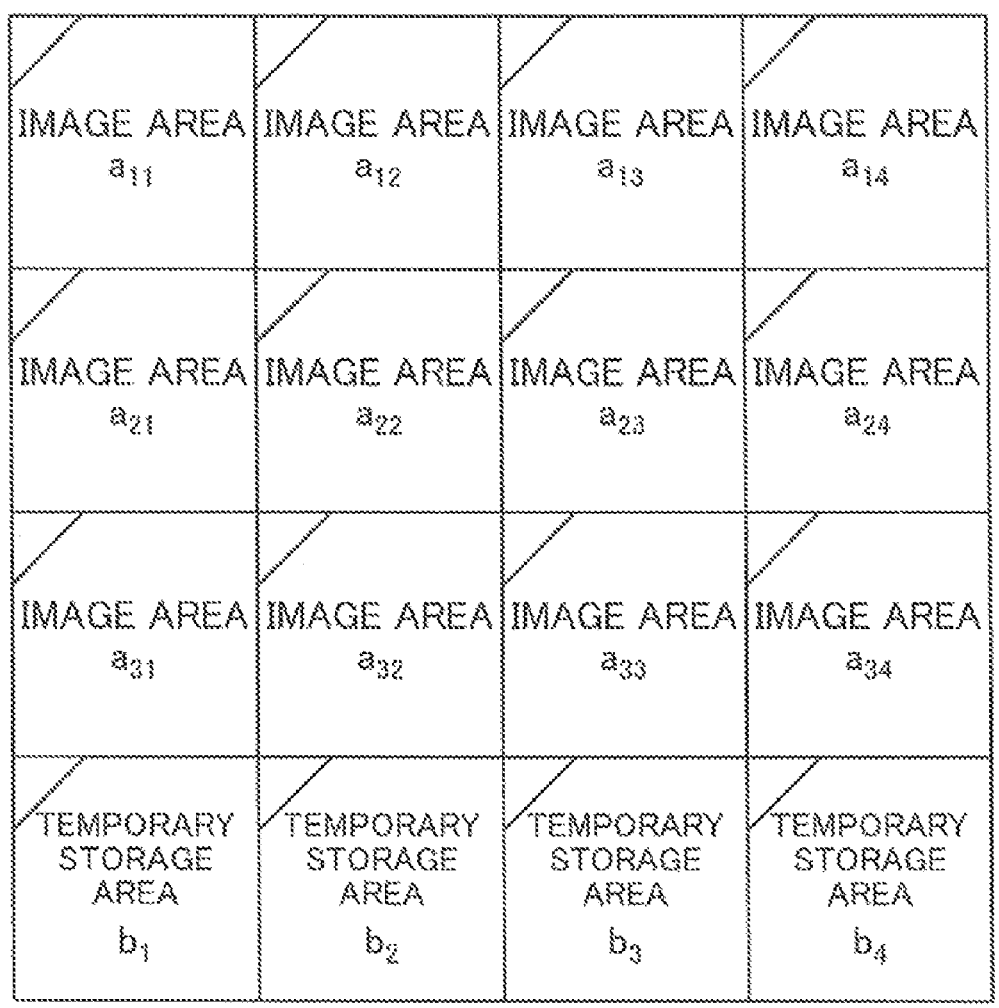
FIG. 4 is a conceptual diagram showing a memory area in which the number of an image areas is twelve (three lines in vertical and four lines in horizontal) and the number of the temporary storage areas is four.
Figure 5:
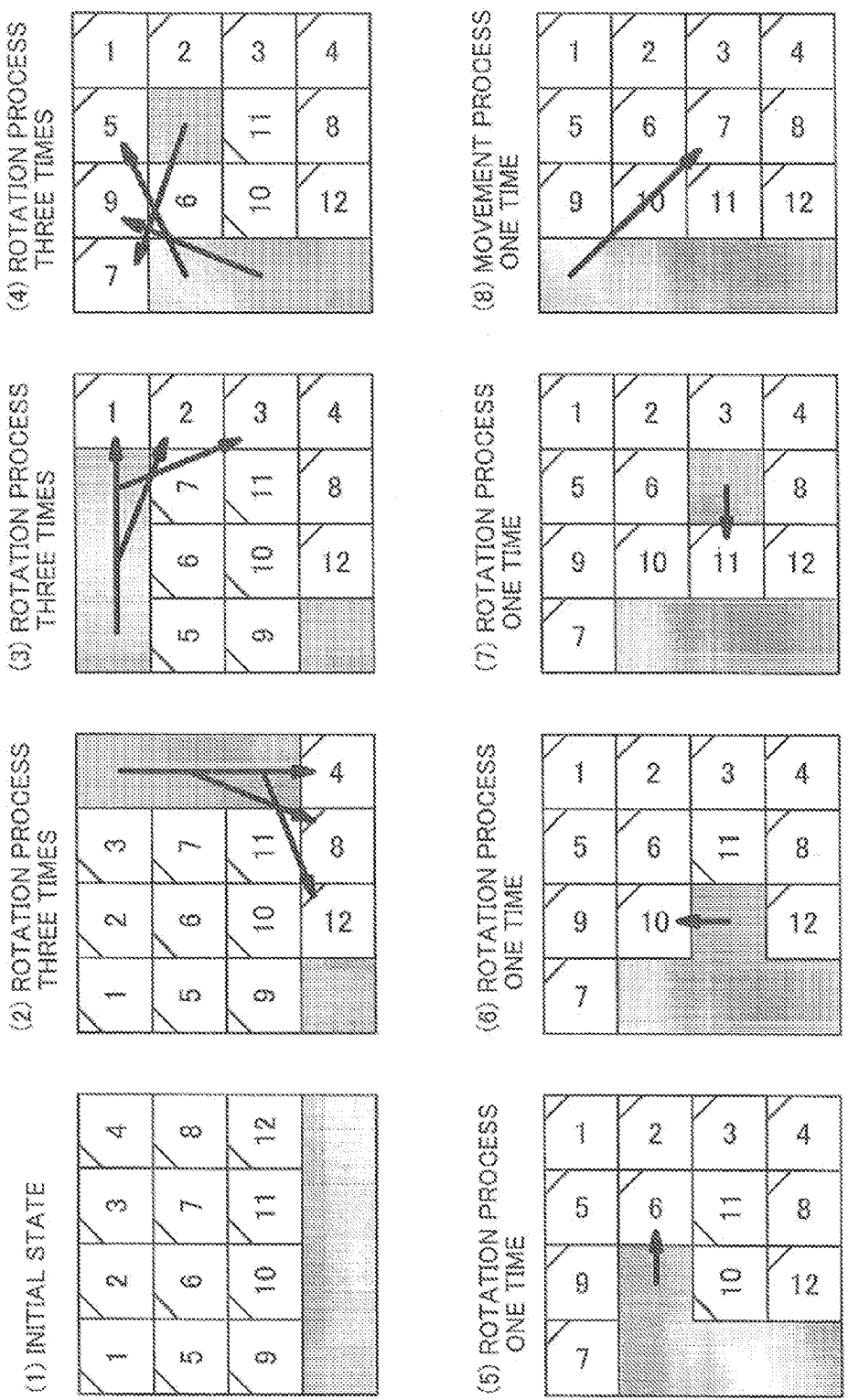
FIG. 5(1) to FIG. 5(8) are explanatory drawings showing the operating state of the memory area shown in FIG. 4.
Figure 6:
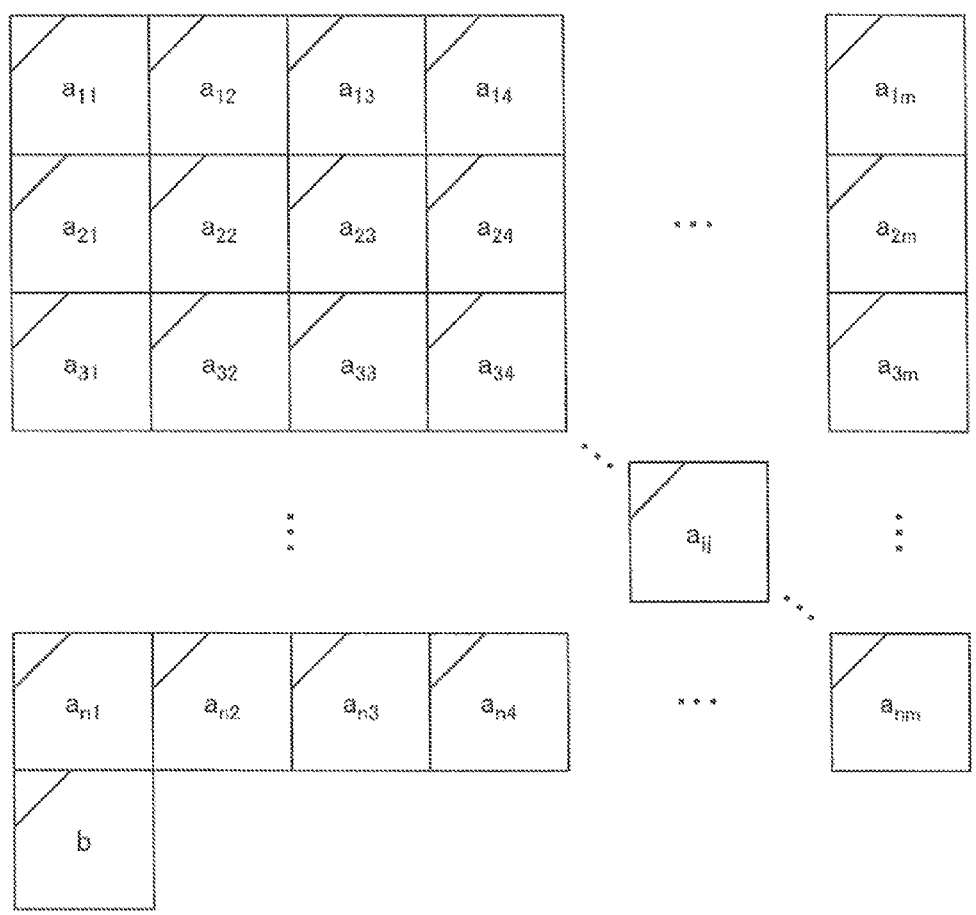
FIG. 6 is an explanatory drawing showing another exemplary embodiment of the method for rotating an image according to the present invention.
Figure 7:
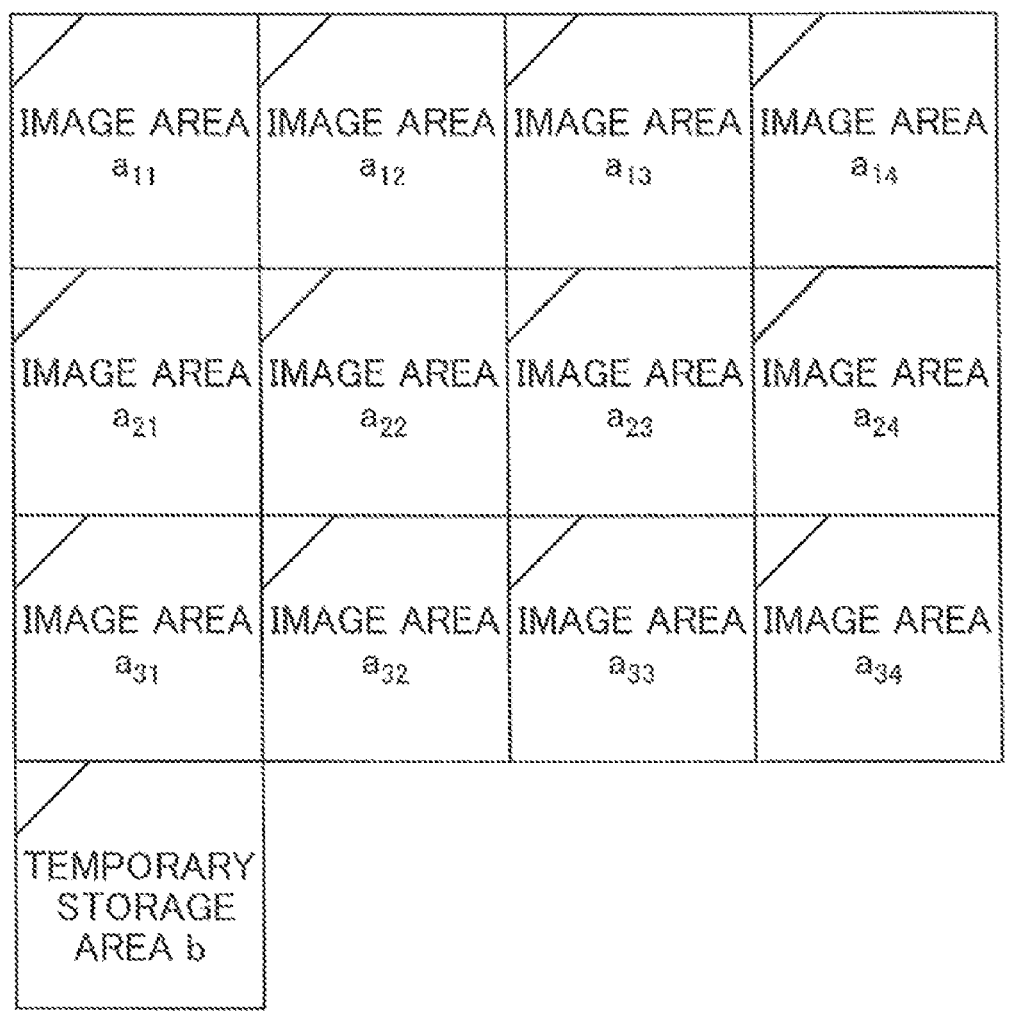
FIG. 7 is a conceptual diagram showing a memory area in which the number of an image areas is twelve (three lines in vertical and four lines in horizontal) and the number of the temporary storage areas is four.

[Explanation of Reference]
100 memory unit
101 rotation unit
102 control unit
103 movement process unit
104 rotation process unit

The invention claimed is:

1. A method for rotating an image characterized by comprising the steps of:
   sectioning a memory area for storing image data into a plurality of square image areas;
   securing one line among lines of a periphery of the memory area in an initial state as a temporary storage area and securing the remaining area as an image area; and
   rotating an image in the initial state by rotating and moving the image data in the memory area for each square unit via the temporary storage area.

2. The method for rotating an image according to claim 1, characterized by comprising the steps of:
rotating and moving one outer line among the image areas in one direction;
rotating and moving another outer line at a right-angle in the same direction;
rotating and moving a square at a center of the image area after rotation and movement to the outside of the image area to secure the temporary storage area;
exchanging the temporary storage area with another square; and
rotating the image in the initial state by exchanging the outer image area with the temporary storage area lastly.

3. The method for rotating an image according to claim 2, characterized by comprising the steps of:
securing image areas which are arranged in m lines in vertical and n lines in horizontal in an initial state, the total number of image areas is m·n, and each of the image areas is defined as: from the left of the uppermost row, an image area a11, an image area a12, an image area a13, an image area a14, . . . , and an image area a1 n; from the left of the next row below the uppermost row, an image area a21, an image area a22, an image area a23, an image area a24, . . . , and an image area a2n; after this, in the same way, and from the left of the lowermost row, an image area am1, an image area am2, an image area am3, an image area am4, . . . , and an image area amn, and a temporary storage area b1, a temporary storage area b2, a temporary area b3, a temporary area b4, . . . , and a temporary area bn that are arranged in one row and n columns below the lowermost row; and
rotating image data in an initial state by rotating the image data in the image area a1n, the image area a2n, the image area a3n, . . . , and the image area amn and moving the rotated image data to the temporary storage area b2, the temporary storage area b3, the temporary storage area b4, . . . , and the temporary storage area bn, respectively; rotating the image data in the image area a11, the image area a12, the image area a13, . . . , and the image area a1 n-1 and moving the rotated image data to the positions of the image area a1n, the image area a2n, the image area a3n, . . . , and the image area am-1 n, respectively; rotating the image data in the image area a21, the image area a31, the image area a41, . . . , and the image area am-1 1 and moving the rotated image data to the positions of the image area a12, the image area a13, the image area a14, . . . , and the image area a1 n-1, respectively; rotating the image data in the image area a32 and moving the rotated image data to the position of the image area a11; and
rotating and moving the image data in each of the image areas to a free area in a small matrix formed with the image area a12, the image area a13, the image area a14, . . . , the image area a1n, the image area a22, the image area a23, the image area a24, . . . , the image area a2n, the image area a32, the image area a33, the image area a34, . . . , the image area a3n, . . . , the image area am2, the image area am3, the image area am4, . . . , and the image area amn via the temporary storage area in order.

4. The method for rotating an image according to claim 2, characterized by comprising the steps of:
securing image areas which are arranged in three lines in vertical and n lines in horizontal in an initial state, the total number of image areas is twelve, and each of the image areas is defined as: from the left of the upper row, an image area a11, an image area a12, an image area a13, an image area a14; from the left of the middle row, an image area a21, an image area a22, an image area a23, and an image area a24; from the left of the lower row; an image area a31, an image area a32, an image area a33 and an image area a34 and a temporary storage area b that is arranged in one row and four columns below the lower row; and
rotating image data in an initial state by rotating the image data in the image area a14, the image area a24 and the image area a34 and moving the rotated image data to the temporary storage area b; rotating the image data in the image area a11, the image area a12 and the image area a13 and moving the rotated image data to the positions of the image area a14, the image area a24 and the image area a34, respectively; rotating the image data in the image area a21 and the image area a31 and moving the rotated image data to the positions of the image area 12 and the image area a13, respectively; rotating the image data in the image area a23 and moving the rotated image data to the position of the image area a11; rotating the image data in the image area a22 and moving the rotated image data to the position of the image area a23; rotating the image data in the image area a32 and moving the rotated image data to the position of the image area a22; rotating the image data in the image area a33 and moving the rotated image data to the position of the image area a32; and moving the image data in the image area a23 which has been moved to the position of the image area a11 to the position of the image area a33.

5. The method for rotating an image according to claim 3 characterized in that a rotation angle of each of said image data is 90 degrees.

6. The method for rotating an image according to claim 3 characterized in that each of said image data is a moving image.

7. The method for rotating an image according to claim 3 characterized in that each of said image data is a still image.

8. The method for rotating an image according to claim 3 characterized in that after movement of said image data from one area to another area, erasure is performed.

9. A method for rotating an image characterized by comprising the steps of:
sectioning a memory area for storing image data into a plurality of squares and securing image areas;
securing a temporary storage area whose size is the same as that of the square outside the image area; and
rotating the image data in an initial state by rotating and moving the image data in the memory area and the temporary storage area for each square unit via the temporary storage area.

10. The method for rotating an image according to claim 9 characterized by comprising the steps of:
moving one image area among said image areas to said temporary storage area;
moving an area of a movement destination in said one image area among said image areas to a free area in said one image area; and
rotating the image data in the initial state by repeating rotation and movement of said one image area to the free area of said movement destination.

11. The method for rotating an image according to claim 10 characterized by comprising the steps of:
securing image areas which are arranged in m lines in vertical and n lines in horizontal in an initial state, the total number of image areas is m·n, and each of the image areas is defined as: from the left of the uppermost row, an image area a11, an image area a12, an image area a13, an image area a14, ..., and an image area a1n; from the left of the next row below the uppermost row, an image area a21, an image area a22, an image area a23, an image area a24, ..., and an image area a2n; after this, in the same way, and from the left of the lowermost row, an image area am1, an image area am2, an image area am3, an image area am4, ..., and an image area amn, and one temporary storage area b below the lowermost row; and rotating the image data in an initial state by repeating the processes of:

temporarily storing the image data in an area aij ($1 \leq i \leq m$ and $1 \leq j \leq n$) in the temporary storage area b for i from 1 to m and for j from 1 to n in order, rotating the image data in an image area axy ($x \neq i$, $1 \leq x \leq m$, $y \neq j$, and $1 \leq y \leq n$) and moving the rotated image data to the position of the area aij, and moving the image data in the temporary storage area b to the position of the image area axy.

12. The method for rotating an image according to claim 10 characterized by comprising the steps of:

securing image areas which are arranged in three lines in vertical and four lines in horizontal, the total number of image areas is twelve, and each of the image areas is defined as: from the left of the upper row, an image area a11, an image area a12, an image area a13, an image area a14; from the left of the middle row, an image area a21, an image area a22, an image area a23, and an image area a24; from the left of the lower row, an image area a31, an image area a32, an image area a33, and an image area a34 and one temporary storage area below the lower row; and rotating image data in an initial state by moving the image data in the image area a11 to the temporary storage area b; rotating the image data in the image area a34 and moving the rotated image data to the position of the image area a11; moving the image data in the temporary storage area b to the position of the image area a34;

moving the image data in the image area a12 to the temporary storage area b;

rotating the image data in the image area a33 and moving the rotated image data to the position of the image area a12; moving the image data in the temporary storage area b to the position of the image area a33; moving the image data in the image area a13 to the temporary storage area b; rotating the image data in the image area a32 and moving the rotated image data to the position of the image area a13; rotating the image data in the temporary storage area b and moving the rotated image data to the position of the image area a32; moving the image data in the image area a14 to the temporary storage area b; rotating the image data in the image area a31 and moving the rotated image data to the position of the image area a14; moving the image data in the temporary storage area b to the position of the image area a31; moving the image data in the image area a21 to the temporary storage area b; rotating the image data in the image area a24 and moving the rotated image data to the position of the image area a21; rotating the image data in the temporary storage area b and moving the rotated image data to the position of the image area a24; moving the image data in the image area a22 to the temporary storage area b; rotating the image data in the image area a23 and moving the rotated image data to the position of the image area a22; and moving the image data in the temporary storage area b to the position of the image area a23.

13. The method for rotating an image according to claim 11 characterized in that a rotation angle of each of said image data is 180 degrees.

14. The method for rotating an image according to claim 11 characterized in that each of said image data is a moving image.

15. The method for rotating an image according to claim 11 characterized in that each of said image data is a still image.

16. The method for rotating an image according to claim 11 characterized in that after movement of said image data from one area to another area, erasure is performed.

17. An image rotation device including a memory unit for storing image data, a movement process unit for performing movement of the image data, a rotation process unit for rotating the image data, and a control unit for controlling the memory unit, the movement process unit and the rotation process unit, characterized in that the control unit sections a memory area of the memory unit into a plurality of squares, secures one line among lines of a periphery of the memory area in an initial state as a temporary storage area, secures the remaining area as an image area, and rotates an image in an initial state by rotating and moving the image data in the memory area for each square unit via the temporary storage area.

* * * * *